United States Patent
Bates et al.

(10) Patent No.: US 7,937,657 B2
(45) Date of Patent: May 3, 2011

(54) USER SPECIFIC ERROR ANALYSIS

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/131,680

(22) Filed: Jun. 2, 2008

(65) Prior Publication Data

US 2008/0229191 A1 Sep. 18, 2008

Related U.S. Application Data

(63) Continuation of application No. 09/592,308, filed on Jun. 13, 2000, now Pat. No. 7,398,467.

(51) Int. Cl.
*G06F 17/00* (2006.01)

(52) U.S. Cl. ......... 715/257; 715/259; 715/260; 715/271

(58) Field of Classification Search .................. 715/257, 715/259, 260, 271
See application file for complete search history.

(56) References Cited

U.S. PATENT DOCUMENTS

| | | | |
|---|---|---|---|
| 4,674,065 A | 6/1987 | Lange et al. |
| 4,847,766 A | 7/1989 | McRae et al. |
| 5,258,909 A | 11/1993 | Damerau et al. |
| 5,572,423 A | 11/1996 | Church |
| 5,576,955 A | 11/1996 | Newbold et al. |
| 5,604,897 A | 2/1997 | Travis |
| 5,659,771 A | 8/1997 | Golding |
| 5,818,437 A | 10/1998 | Grover et al. |
| 5,890,182 A | 3/1999 | Yagisawa et al. |
| 5,907,839 A | 5/1999 | Roth |
| 5,940,847 A | 8/1999 | Fein et al. |
| 5,956,739 A | 9/1999 | Golding et al. |
| 5,987,302 A | 11/1999 | Driscoll et al. |
| 6,003,023 A | 12/1999 | Schmidt |
| 6,175,834 B1 | 1/2001 | Cai et al. |
| 7,398,467 B1 | 7/2008 | Bates et al. |

OTHER PUBLICATIONS

Lon-Mu Liu et al., "Adaptive Post-Processing of OCR Text Via Knowledge Acquisition," Proceedings of the 19th annual conference on Computer Science published by ACM Press, 1991, pp. 558-569.

*Primary Examiner* — Amelia Rutledge
(74) *Attorney, Agent, or Firm* — Patterson & Sheridan, LL

(57) ABSTRACT

A method, an article of manufacture and apparatus for providing user-specific error analysis for a document. Specifically, the invention provides for identifying user-specific proclivities for confusing particular words which, while grammatically correct, are not used as intended by the user. The proclivities are tracked by recording changes made by the user while editing a document. The information collected while tracking the changes is then used to identify problem words to the user at a later period in time.

14 Claims, 3 Drawing Sheets

| | WORD | PRIORITY | COLOR | NUMBER OF CHANGES | REPLACEMENT WORD |
|---|---|---|---|---|---|
| R31 | AND | 1 | RED | 2 | AN |
| R32 | THEY'RE | 2 | BLUE | 1 | THEIR |
| R33 | THERE | 2 | BLUE | 1 | THEIR |
| R34 | THEIR | 2 | BLUE | 1 | THERE |

310 320 330 340 350

202 — USER NAME

300

| | WORD | PRIORITY | COLOR | NUMBER OF CHANGES | REPLACEMENT WORD |
|---|---|---|---|---|---|
| R31 | AND | 1 | RED | 2 | AN |
| R32 | THEY'RE | 2 | BLUE | 1 | THEIR |
| R33 | THERE | 2 | BLUE | 1 | THEIR |
| R34 | THEIR | 2 | BLUE | 1 | THERE |
202 — USER NAME    ← 300
*Fig. 3*
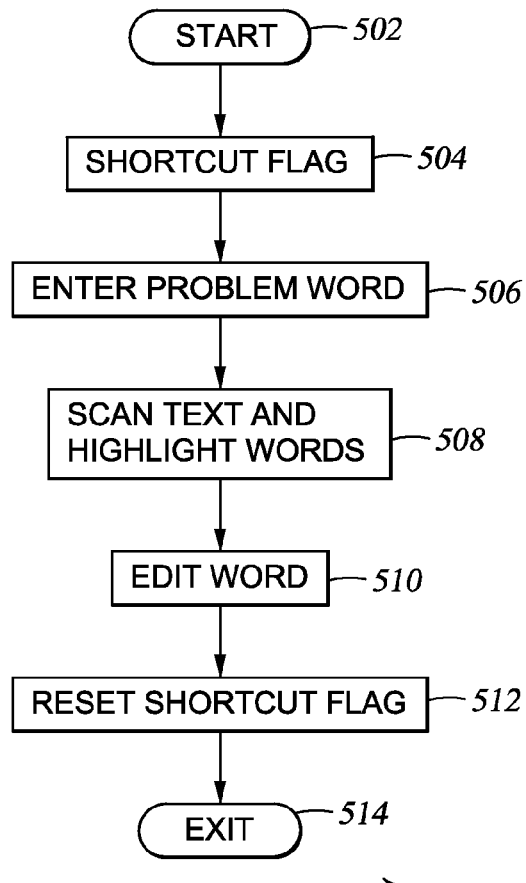
*Fig. 5*
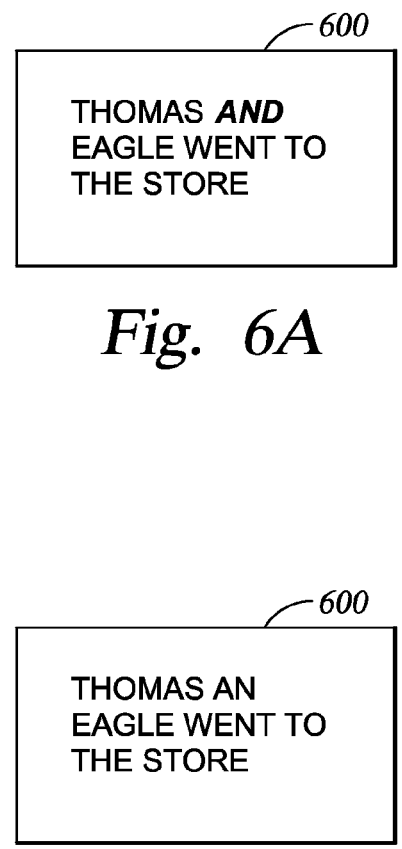
*Fig. 6A*
*Fig. 6B*

USER SPECIFIC ERROR ANALYSIS

CROSS-REFERENCE TO RELATED APPLICATIONS

This application is a continuation of U.S. patent application Ser. No. 09/592,308, filed Jun. 13, 2000, now U.S. Pat. No. 7,398,467 which is herein incorporated by reference in its entirety.

BACKGROUND OF THE DISCLOSURE

1. Field of the Invention

This invention relates to text editing systems, and, more particularly, the invention relates to a method, an article of manufacture and apparatus for performing spelling analysis.

2. Description of the Background Art

Computer-based text editors can be found in word processors and spreadsheets for providing spelling and grammar correction. One purpose of document checking software is to assist a person in producing a high quality document without spelling and grammar mistakes. Implicit in producing a high quality document is that corrections be made in the least amount of time and that the software be able to accurately detect a user's mistakes.

Conventional spell and grammar checking software analyze a user's document for errors by comparing the words in the user's document to the words in the software's database. If words in the user's document do not match words in the software's database, the user's words are highlighted, and the user is given the option to change the word.

However, one problem with conventional spell and grammar checking software is that the software analyzes a user's document with no reference to a user's spelling habits. For instance, a user may have a habit of typing the word "an" rather than the word "and". Since the word is spelled correctly, the word would not be detected by a conventional software.

A second problem with conventional spell and grammar checking software is the inability of the software to detect a user's problem words. For instance, the two sentences, "Thomas and Eagle went to the store" and "Thomas an Eagle went to the store" are both grammatically correct. Hence, conventional software would not be able to detect the user's problem words "and" and "an". Therefore, the user would have to manually detect the correction. This results in inefficient use of time and lost productivity for the user.

Therefore, a need exists in the art for a method, an article of manufacture and apparatus for providing spelling analysis in an efficient manner.

SUMMARY OF THE INVENTION

The invention provides a method, an article of manufacture and apparatus for providing spelling analysis for a document.

One aspect of the invention provides a method for providing user-specific error analysis to identify as problem words any correctly spelled words of a document that are improperly used. The method comprises recording contents of the document as pre-edited contents, allowing a user to replace each problem word contained in the document with a respective replacement word. The problem words and replacement words are then stored to a first data structure, wherein each problem word is associated with the respective replacement word.

Another aspect of the invention provides a computer readable medium containing a program which, when executed by a processor, performs the method described above.

Still another aspect of the provides a computer comprising a memory device, a processor configured to access the memory device and configure to execute the method described above for providing user-specific error analysis to identify as problem words any correctly spelled words of a document that are improperly used.

BRIEF DESCRIPTION OF THE DRAWINGS

The teachings of the present invention can be readily understood by considering the following detailed description in conjunction with the accompanying drawings, in which:

FIG. 3 depicts an illustrative problem word table suitable for use in the computer system of FIG. 1;

FIG. 5 depicts a flow diagram of a shortcut for providing spelling analysis according to the present invention; and FIGS. 6A and 6B depict illustrative sentences for showing an application of the invention.

To facilitate understanding, identical reference numerals have been used, where possible, to designate identical elements that are common to the figures.

DETAILED DESCRIPTION OF THE PREFERRED EMBODIMENT

Figures 1, 2:
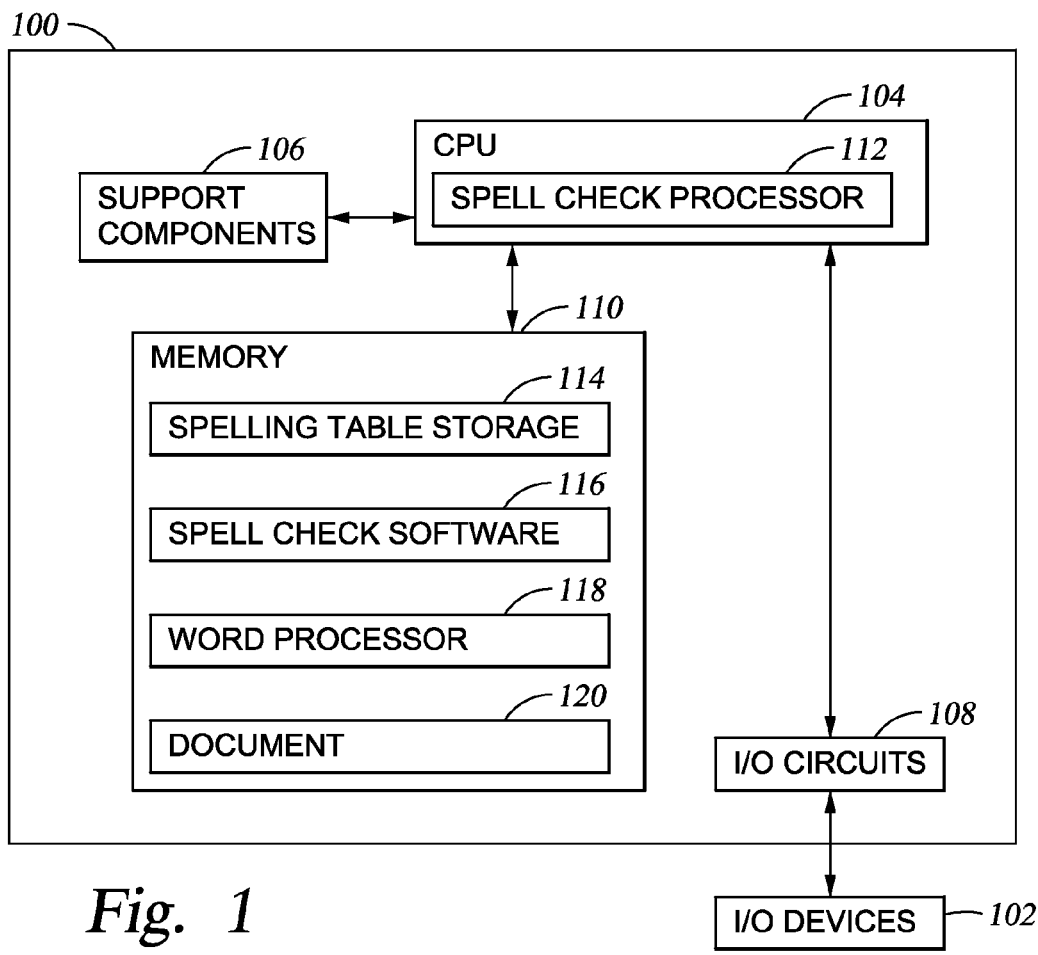
FIG. 1 depicts a high level block diagram of a computer system suitable for use with the present invention for providing spelling analysis.
FIG. 2 depicts an illustrative analysis spelling list in tabular form suitable for use in the computer system of FIG. 1.

FIG. 1 depicts a high level block diagram of a computer system 100 suitable for use with the present invention for providing spelling analysis in accordance with the present invention. Specifically, the computer system 100 includes a computer 101 and an input/output device or devices 102 such as a monitor, a keyboard, a mouse, a trackball and the like. The computer 101 comprises a central processing unit 104, support components 106, input/output circuits 108 and a memory 110. The memory 110 may be a solid state memory, a disc drive, an optical memory, a removable memory device, or a combination of memory devices. The input/output circuits 108 provide a well-known interface from the CPU 104 to the I/O devices 102. Additionally, the I/O circuits 108 may optionally contain a network interface card or modem that couples the computer to a network such that a user may have access to the present invention from any computer connected to the network. The support components 106 are well known in the art and include such components as cache, power supplies, clock circuits, and the like.

The combination of all the components and elements shown in FIG. 1 forms a general purpose computer that, when executing a particular software package or routine, becomes a specific purpose computer. In this case, the CPU 104, when executing the spell check software 116 of the present invention, operates as a spell checking processor. The spell check software 116, word processor 118 and document 120 reside in memory 110. Memory 110 also includes data structures necessary for the operation of spell check software 116. For example, one such data structure is pre/post analysis spelling table 200. An embodiment of pre/post analysis table 200 is shown in FIG. 2. A second example of a data structure is problem word table 300. One such embodiment is shown in FIG. 3. Both pre/post analysis table 200 and problem word table 300 are stored in spelling table storage 114 within the memory 110.

As will be described in detail below, one embodiment of the invention is implemented as a program product for use with a computer, for example, computer system 100. The program(s) of the program product defines functions of the preferred embodiment and can be contained on a variety of signal bearing media, which include, but are not limited to (i) information permanently stored on non-writable storage media (e.g., read only memory devices within a computer such as CD-ROM disks readable by a CD-ROM drive); (ii) alterable information stored on writable storage media (e.g. floppy disks within a diskette drive or hard disk drive); or (iii) information conveyed to a computer by a communications medium, such as through a computer or telephone network, including wireless communications. Such signal bearing media, when carrying computer readable instructions that direct the functions of the present invention, represent embodiments of the present invention.

FIG. 2 depicts an illustrative pre/post analysis spelling list 200 in tabular form suitable for use in the computer system of FIG. 1. Specifically, pre/post analysis table 200 comprises a user name identifier within a user name field 202 and a plurality of records R21 through R29, each record is associated with a respective PRE field 210, a respective POST field 220 and a respective CHANGED field 230.

FIG. 3 depicts an illustrative problem word table 300 suitable for use in the computer system of FIG. 1. Specifically, problem word table 300 comprises a user name identifier within a user name field 202 and a plurality of records R31 through R34. Each record is associated with a respective WORD field 310, a respective PRIORITY field 320, a respective COLOR field 330, a respective NUMBER of CHANGES field 340 and a respective REPLACED WORD field 350.

The WORD field 310 indicates a word from table 200 that was changed. The PRIORITY field 320 indicates a priority level for problem words allowing particular words to be grouped together. For example, the user may find that "they're", "there" and "there" are problem words that are frequently encountered and may seek to group those words in the same priority levels. The COLOR field 330 indicates a color for a problem word based on the problem word's respective priority level. The NUMBER of CHANGES field 340 indicates the amount of times a respective problem word has been changed to a correct word. In one embodiment, the field 340 is used to determine which problem word should receive high priority. A problem word with a large number of changes could be indicative of a proclivity to incorrectly use that particular problem word and may be given a higher priority. The REPLACED WORD field 350 indicates the replacement word to use whenever the respective problem word is encountered.

Figure 4:
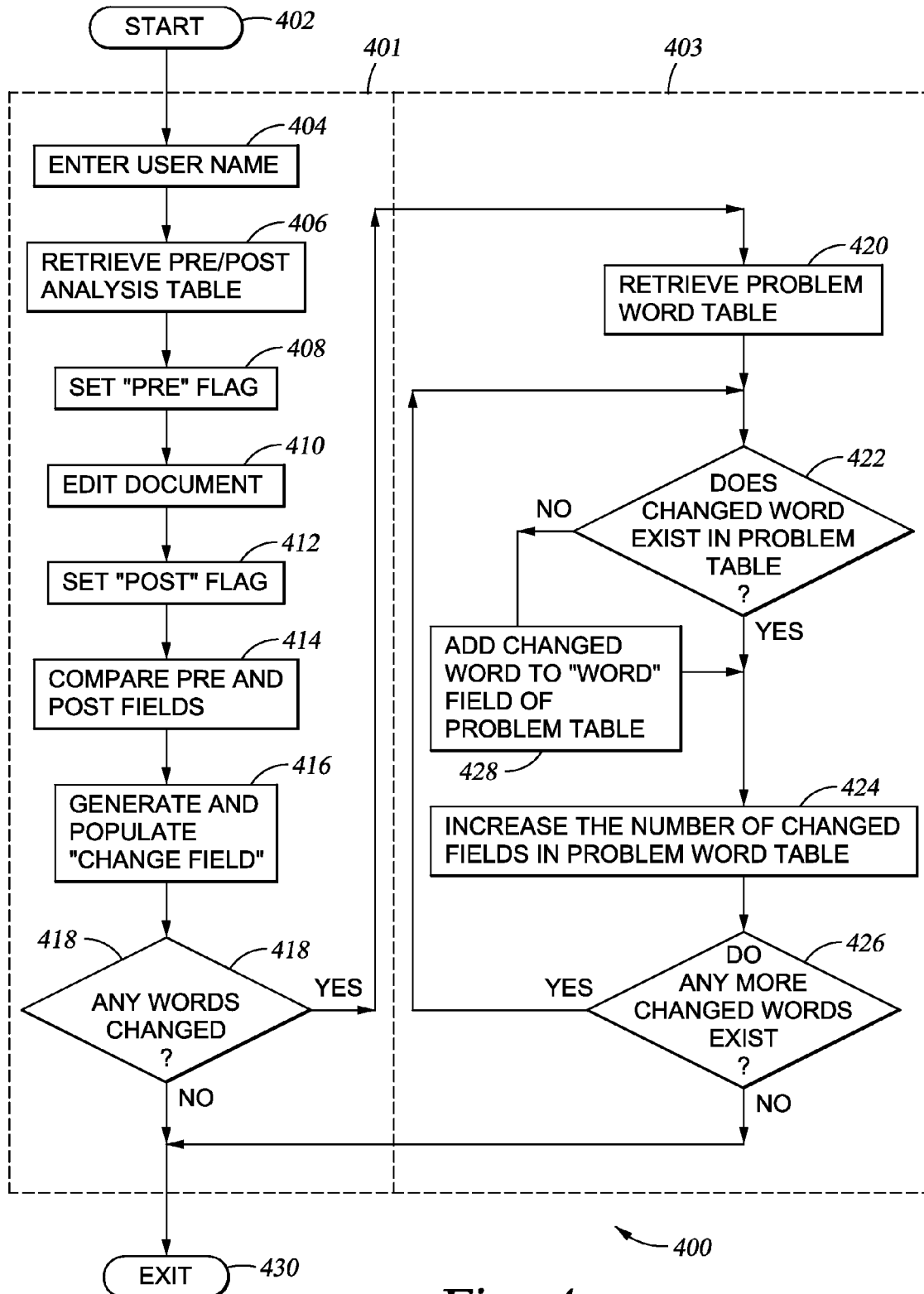
FIG. 4 depicts a flow diagram of a spelling analysis method useful for understanding the present invention.

FIG. 4 depicts a flow diagram of a spelling analysis method 400 useful in understanding the present invention. To best understand the invention, the reader should simultaneously refer to FIGS. 2-4.

The method 400 comprises a pre/post analysis stage 401 and a problem word table generation stage 403. The method 400 is initiated at step 402 and proceeds to step 404 where the user has completed a document and executes the spell check software 116 and is prompted for a user name. By inputting a user name in the user name field, the user name will be assigned to a corresponding table 200 and table 300. If the user does not input a user name, a default user name will be assigned to the user corresponding to all non-specified users and a corresponding table 200 and 300 will be assigned.

At step 406, the pre/post analysis table 200 is retrieved from memory 110. The method 400 proceeds to step 408 where a "pre" flag is set. Setting the "pre" flag causes the PRE field 210 to be populated with all the words from the users' document.

The user then executes the spell check software 116 of the invention to perform pre-processing wherein the document (or selected text) is scanned by spell check processor 112. Each word is placed in PRE field 210, which indicates pre-processed words. Illustratively, the user's document comprises the sentence, "We are going to and open house to celebrate". Accordingly, PRE field 210 of records R21 through R29 is depicted as containing the following words from the users document: "we" in R21, "are" in R22, "going" in R23, "to" in R24, "and" in R25, "open" in R26, "house" in R27, "to" in R28 and "celebrate" in R29.

It should be noted that table 200 is shown with only nine records (R21 through R29). However, it will be appreciated by those skilled in the art that table 200 may comprise an unlimited number of records.

Next, at step 410, the user manually reviews the document and identifies and corrects problem words. At step 412 the "post" flag is set. By setting the "post" flag, the spell check processor 112 stores every word of the edited document to the POST field 220. In this example, the problem word is "and" and the user corrects the word to "an". POST field 220 of records R21 through R29 is depicted as indicating the processed words as follows: "we" in R21, "are" in R22, "going" in R23, "to" in R24, "an" in R25, "open" in R26, "house" in R27, "to" in R28 and "celebrate" in R29. The method 400 proceeds to step 414.

At step 414, the spell check processor 112 compares PRE field 210 of records R21 through R29 to POST field 220 of records R21 through R29. At step 416, the results are placed in CHANGED field 230. CHANGED field 230 of records R21 through R29 is depicted as follows: "no" in R21, "no" in R22, "no" in R23, "no" in R24, "yes" in R25, "no" in R26, "no" in R27, "no" in R28 and "no" in R29. Illustratively, record R25 of table 200 indicates that a pre-process word "and" was compared to a post process word "an" and that a word change was made. The changed words are referred to herein as "problem words".

At step 418, a query is made as to whether there is a "yes" value in CHANGED field 230. If the query at step 418 is answered negatively, then the method 400 proceeds to step 430. If the query at step 418 is answered affirmatively, then the method proceeds to step 420 where the problem word table 300 is retrieved.

Field 310 of record R31 of problem word table 300 indicates that "and" is a problem word for the user. The value contained in field 320 for that particular word is "1" indicating the highest priority. For instance, selection of a priority level may be based on the number of instances the particular problem word has been changed. Field 330 indicates the color assigned to this problem word is "red". Thus, for each instance of the problem word, in a document the word will be highlighted in "red". Field 340 indicates that the problem word has been changed twice since the user has been operating spell check software 116. Field 350 indicates the user has determined from pre/post analysis table 200 that the problem word has been used incorrectly and has replaced the problem word with "an".

Field 310 of record R32 of problem word table 300 indicates that "they're" is a problem word for the user. The value contained in field 320 for that particular word is "2" indicating a nearly high priority level. Field 330 indicates the selected color assigned to this problem word is "blue". Thus, for each instance of the problem word, in a document the word will be highlighted in "blue". Field 340 indicates that the problem word has been changed once since the user has been operating spell check software 116. Field 350 indicates the user has determined from pre/post analysis table 200 that the problem word has been used incorrectly and has replaced the problem word with "their".

Field 310 of record R33 of problem word table 300 indicates that "there" is a problem word for the user. The value contained in field 320 for that particular word is "2" indicating a nearly high priority level. Field 330 indicates the selected color assigned to this problem word is "blue". Thus, for each instance of the problem word, in a document the word will be highlighted in "blue". Field 340 indicates that the problem word has been changed once since the user has been operating spell check software 116. Field 350 indicates the user has determined from pre/post analysis table 200 that the problem word has been used incorrectly and has replaced the problem word with "their".

Field 310 of record R34 of problem word table 300 indicates that "their" is a problem word for the user. The value contained in field 320 for that particular word is "2" indicating a nearly high priority level. Field 330 indicates the selected color assigned to this problem word is "blue". Thus, for each instance of the problem word, in a document the word will be highlighted in "blue". Field 340 indicates that the problem word has been changed once since the user has been operating spell check software 116. Field 350 indicates the user has determined from pre/post analysis table 200 that the problem word has been used incorrectly and has replaced the problem word with "there".

Field 350 of records R31, R32, R33, and R34 indicate that "an", "their", "their" and "there" are replacement words for the respective problem words. For instance, after a user confirms in table 200 that the changes between PRE field 210 and Post field 220 are what the user wanted, spell check processor 112 populates Field 350 of table 300 with values in Post field 220 based on a "yes" value in CHANGED field 230.

It is noted that table 300 is shown with only four records (R31 through R34). However, it will be appreciated by those skilled in the art that table 300 may comprise an unlimited number of records.

Although problem word table 300 is described as being used after the pre/post analysis table 200 has been populated, the problem word table 300 can be used separately from the pre/post analysis table 200. For instance, once the problem word table 300 has been populated by the pre/post analysis table 200 from previous sessions, the user can retrieve problem word table 300 and scan a document for problem words.

In another embodiment of the invention, the user can assign priority levels and colors to problem words. For example a user may determine that the problem word with the lowest number of changes should be given the highest priority level. In addition the user can select a color to assign to any problem word. Although colors are mentioned as a means of characterizing problem words, it should be noted that any type of characterization of the problem words may be used by those skilled in the art.

In another embodiment of the invention, prior art spell check or grammar software is utilized to group problem words. For example, "there", "their" and "they're" may be grouped together since these words may be incorrectly substituted for each other by a user. Using the present invention, the words could be placed in problem word table 300 and the user prompted as to whether a change should be made whenever any of the grouped words are encountered in a document.

In another embodiment of the invention, as soon as a user types a problem word that is in problem word table 300, the user is prompted as to whether the word should be changed or not. Illustratively, the prompting can be a dialog box or word highlighting.

In another embodiment of the invention, the invention can be used to compare two documents and synchronize or match words. In comparing the PRE field 210 and Post field 220 the invention can allow for the addition and deletion of words in a document. For instance, if the only change to the second document is to add the word "eventually", the invention will detect that "eventually" is a new word. Therefore, the word "eventually" will not be displayed in Post field 220. Similarly, if the word "happy" is deleted from the second document, the invention will detect that "happy" was deleted and not record the deletion as a change in Changed field 230.

Returning again to FIG. 4, a query is made at step 422 as to whether the changed word exists in the problem word table 300. If the query at step 422 is answered affirmatively, the method 400 proceeds to step 424. At step 424, the value contained in the Number of Changes field 340 of table 300 is increased by one for the respective changed word.

If the query at step 422 is answered negatively, the method proceeds to step 428 where the changed word is added to the WORD field 310 of the problem word table 300. The method 400 then returns to step 424.

At step 426 a query is made as to whether any more changed words exist in the pre/post analysis table 200. If the query at step 426 is answered affirmatively, the method 400 returns to step 422. Accordingly, method 400 returns to step 422 for each changed word contained in table 200. If the query at step 426 is answered negatively, the method 400 proceeds to step 430.

After determining that no changed words exist in the pre/post analysis table 200 (step 418) or determining that no additional changed words exist in the pre/post analysis table 200 (step 426), the method 400 proceeds to step 430, where the method exits.

FIG. 5 depicts a flow diagram of a shortcut method 500 for providing spelling analysis according to the present invention. Accordingly, the user can avoid typing the whole document, making changes to the document and having those changes recorded in the problem word table 300. The method 500 allows a user to quickly target specific words that the user knows before hand are problem words. The method 500 is initiated at step 502 and proceeds to step 504. At step 504, a short-cut flag is set, and the method proceeds to step 506.

At step 506, the user is prompted for a problem word. The user then inputs a problem word. The method 500 proceeds to step 508 where the document (or selected text) is scanned and the problem words are highlighted throughout the document.

At step 510, the problem words are edited by the user according to whether each of the identified problem words is used correctly or not. The method 500, then proceeds to step 512.

At step 512, the short-cut flag is reset. If the short-cut flag is not reset, the problem words in the document will continue to be highlighted and spell check software 116 remains in the short cut state. The method 500 then proceeds to step 514 where the method 500 ends.

In operation, the data collected and stored in table 300 is utilized to identify problem words in a target document. FIGS. 6A and 6B show a display area 600 of an output device (e.g., a monitor) and illustrate an application of the invention. FIG. 6 shows an uncorrected sentence which contains a problem word (i.e., the word "and"). The problem word is identified by accessing table 300 which has been previously populated in the manner described above. As shown in FIG. 3, field 310 of record R31 contains the problem word "and". Since the problem word "and" is contained in the user's sentence, the word "and" in the user's document will be highlighted in red according to the color definition contained in field 330. For purposes of illustration, the problem word is shown bolded in FIG. 6A.

A replacement word "an" from Replacement Word field 350 of record R31 will then be displayed to the user. The user will then determine whether the word "and" should be replaced with the word "an". If the user determines the word "and" should be replaced, the spell check software 116 will make the correction in the user's document. The corrected sentence is shown in FIG. 6B.

It should be noted that both the sentences, "Thomas and Eagle went to the store" and "Thomas an Eagle went to the store" are grammatically correct. The use of problem table 300 allows the user to detect problem words that would be undetectable by prior art software.

Although various embodiments which incorporate the teachings of the present invention have been shown and described in detail herein, those skilled in the art can readily devise many other varied embodiments that still incorporate these teachings.

What is claimed is:

1. A computer readable storage medium containing a software program which, when executed by a processor, causes the processor to perform an operation for providing user-specific error analysis to identify as problem words any correctly spelled words of a document that are improperly used, the operation comprising:
   recording each word contained in a first document as pre-edited contents;
   receiving user edits replacing each problem word contained in the first document with a respective replacement word;
   after receiving the user edits, recording the each word contained in a first document as post-edited contents;
   comparing the pre-edited contents to the post-edited contents to identify the problem words and the respective replacement words;
   storing the user-replaced problem words and respective replacement words to a first data structure, wherein each user-replaced problem word is associated with the respective replacement word in an individual record of the first data structure and wherein each individual record includes a field indicating a number of times a respective user-replaced problem word has been replaced by its associated replacement word;
   assigning a formatting definition to each problem word for use in identifying problem words on a display device, wherein the formatting definition is reflective, on a display device displaying the respective problem word, of the number of times the respective problem word has been replaced by its associated replacement word;
   determining whether one or more problem words are present in a second document utilizing the first data structure; and
   indicating each problem word present in the second document with its respective formatting definition, wherein respective problems words are displayed in respective visually distinguishable formats.

2. The computer readable storage medium of claim 1, wherein the steps of recording comprise separately storing the pre-edited contents and post-edited contents to a second data structure, wherein each record of the second data structure includes a pre-edited word field containing pre-edited content, a post-edited word field containing corresponding post-edited content and a changed indication field containing an indicator indicating whether the pre-edited and the corresponding post-edited content are different.

3. The computer readable storage medium of claim 2, wherein the operation further comprises assigning a priority value to each problem word based on the number of times a respective problem word has been replaced by its associated replacement word.

4. The computer readable storage medium of claim 3, wherein the formatting definition is based on the priority value.

5. The computer readable storage medium of claim 4, wherein problem words assigned with the same priority value are assigned the same formatting definition and wherein the problems words assigned with different priority values are displayed with respectively different visual distinguishable formats in the second document.

6. The computer readable storage medium of claim 5, wherein the formatting definition is selected from one of a color, a shading, a textual modification, an underline and any combination thereof.

7. The computer readable storage medium of claim 1, wherein the operation further comprises:
   receiving a user identification; and
   storing the user identification in association with the first data structure.

8. A computer comprising a memory device, a processor configured to access the memory device and configured to execute an operation for providing user-specific error analysis to identify as problem words any correctly spelled words of a document that are improperly used, the operation comprising:
   recording each word contained in a first document as pre-edited contents;
   receiving user edits replacing each problem word contained in the first document with a respective replacement word;
   after receiving the user edits, recording each word contained in the edited first document as post-edited contents;
   comparing the pre-edited contents to the post-edited contents to identify the problem words and the respective replacement words;
   storing the user-replaced problem words and respective replacement words to a first data structure, wherein each user-replaced problem word is associated with the respective replacement word in an individual record of the first data structure and wherein each individual record includes a field indicating a number of times a respective user-replaced problem word has been replaced by its associated replacement word;
   assigning a formatting definition to each problem word for use in identifying problem words on a display device, wherein the formatting definition is reflective, on a display device displaying the respective problem word, of the number of times the respective problem word has been replaced by its associated replacement word;
   determining whether one or more problem words are present in a second document utilizing the first data structure; and
   indicating each problem word present in the second document with its respective formatting definition, wherein respective problems words are displayed in respective visually distinguishable formats.

9. The computer of claim 8, wherein the steps of recording comprise separately storing the pre-edited contents and post-edited contents to a second data structure, wherein each record of the second data structure includes a pre-edited word field containing pre-edited content, a post-edited word field containing corresponding post-edited content and a changed indication field containing an indicator indicating whether the pre-edited and the corresponding post-edited content are different.

10. The computer of claim 9, wherein the operation further comprises assigning a priority value to each problem word based on the number of times a respective problem word has been replaced by its associated replacement word.

11. The computer of claim 10, wherein the formatting definition is based on the priority value.

12. The computer of claim 11, wherein problem words assigned with the same priority value are assigned the same formatting definition and wherein the problems words assigned with different priority values are displayed with respectively different visual distinguishable formats in the second document.

13. The computer of claim 12, wherein the formatting definition is selected from one of a color, a shading, a textual modification, an underline and any combination thereof.

14. The computer of claim 8, wherein the operation further comprises:
  receiving a user identification; and
  storing the user identification in association with the first data structure.

* * * * *